(12) United States Patent
Eggers

(10) Patent No.: US 8,534,741 B2
(45) Date of Patent: Sep. 17, 2013

(54) LOCKING MECHANISM FOR A FLEXIBLE COVER SYSTEM

(75) Inventor: Ronald L. Eggers, Fremont, NE (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 13/348,328

(22) Filed: Jan. 11, 2012

(65) Prior Publication Data

US 2013/0175822 A1 Jul. 11, 2013

(51) Int. Cl.
*B60P 7/04* (2006.01)
(52) U.S. Cl.
USPC .............. 296/98; 296/100.14; 296/100.15
(58) Field of Classification Search
USPC ............... 296/98, 100.01, 100.14, 100.16,
296/100.18, 100.04, 100.12, 100.15
See application file for complete search history.

(56) References Cited

U.S. PATENT DOCUMENTS

| 5,957,523 | A | * | 9/1999 | Haddad, Jr. ................ 296/98 |
| 5,983,572 | A | * | 11/1999 | Laboy ........................ 52/23 |
| 8,205,393 | B1 | * | 6/2012 | Harrop et al. ................ 52/3 |

* cited by examiner

*Primary Examiner* — Dennis Pedder
*Assistant Examiner* — Beverly Becker
(74) *Attorney, Agent, or Firm* — Maginot, Moore & Beck, LLP

(57) ABSTRACT

A locking mechanism is provided for a tarping system having a flexible cover deployable from a roller assembly for covering a container and a mechanism for extending and retracting the cover from the roller assembly. The locking mechanism includes a locking element, such as a taut cable, mounted to the roller assembly and spanning the width of the cover. The locking element is arranged on the roller assembly with a portion of the length of the cover less than the entire length of the cover wound around the locking element. This portion of the cover corresponds to an extended length of the cover. The locking mechanism prevents further advancement of the cover from the roller assembly once the locking mechanism is uncovered when the cover is unwound.

20 Claims, 5 Drawing Sheets

LOCKING MECHANISM FOR A FLEXIBLE COVER SYSTEM

BACKGROUND

The present invention relates to flexible cover or tarping systems for open-topped containers and particularly concerns a mechanism for locking the flexible cover or tarp extended over the container.

Many hauling vehicles, such as dump trucks, include open-topped containers used for hauling or storing various materials. In a typical dump truck application, the dump body is used to haul a variety of particulate material, such as gravel and the like, as well as organic materials, such as grain or produce. Depending upon the nature of the materials stored in the open-topped container, it is often desirable to provide a cover for the container. A cover is particularly valuable when the containers are part of a vehicle, such as a dump truck. Rigid covers have given way to flexible cover systems that utilize a flexible tarpaulin (tarp) that can be drawn from a stowed position at one end of the container to a deployed position covering the open top of the vehicle container or bed. The flexible cover or tarpaulin is preferable in this arena because it can be easily stowed when the cover is not necessary, such as when a dump truck is being loaded or emptied. In addition, the flexible cover is generally easier to deploy than a rigid cover.

A variety of flexible cover or tarping systems have been developed that are geared toward particular hauling vehicle applications. One such tarping system is the Easy Cover® Tarping System manufactured and sold by Aero Industries, Inc. An example of one form of the Easy Cover® Tarping System is shown in FIG. 1. The vehicle 10 includes a dump body 11 with a flexible cover or tarp 13 sized to cover the entire open top of the dump body when in the deployed position shown in the figure. The vehicle is provided with a deployment and retraction mechanism that is operable to extend the tarp over the container and to retract the container to a stowed position. The tarp is stored within a storage assembly 14 that may be mounted toward the front of the vehicle 10, as reflected in FIG. 1 or that may be mounted on a movable bail arm assembly 16 used to extend the tarp to its deployed position. The storage assembly includes a roller assembly 15 that may rotatably mounted to the vehicle or to the movable bail arm, and is configured to roll up the tarp 13 to its stowed position and to unfurl the tarp as it is pulled away from the roller assembly. The bail arm assembly 16 is connected to a free end of the tarp 13 and is configured to draw the tarp out of the roller assembly 14 as the bail arm assembly sweeps over the dump body. In the illustrated embodiment, the storage assembly includes a housing 18 mounted to the front of the dump body 11. A drive assembly 12 may be mounted to the housing 18 that is operable to retract the tarp back into the housing. The drive assembly may be motorized or manual but is configured to rotate the roller assembly to continuously wind the tarp thereon.

One problem that is persistently faced with tarping systems of the type shown in FIG. 1 is the effect of air flow or wind as the vehicle is traveling. This problem becomes especially acute at high speeds. If the tarpaulin 13 is not properly restrained in its deployed position it can be damaged by flapping and whipping over the top of the dump body. Road vibration can have a similar effect on the tarp. This excess movement of the tarp can cause it to unroll from the roller assembly 15 even when the free end of the tarp is held at the rear end of the dump body. This unrolling leads to more flapping of the tarp, particularly when traveling at highway speeds, causing more damage to the tarp and even to the storage assembly 14 and dump body.

In order to address this problem, various systems have been devised to hold the tarp down against the container body. In one common system, a web of cords is laid over the tarp cover along the length of the container body and attached to mounts fixed to the side of the body. In other systems, the bail member includes a tie down that can be manually attached to mounts at the rear of the body. Still other systems rely upon a complicated array of mechanical, electrical or hydraulic structures to apply a constant tension along the length of the tarp. However, in most cases, the tension along the length of the tarp does not alleviate the problem of bellowing of the side edges of the tarp or bouncing of the bail member.

In other systems, a separate hold-down arm assembly is provided that bears against a forward portion of the tarp to hold it against the top rail of the dump body. This type of hold-down system is typically self-deployed and less complicated than the other approaches discussed above. However, even with this type of system tarp billowing or vibration can still cause the tarp to gradually unroll. Moreover, these types of hold-down systems have difficulty in generating enough force or torque to keep the cover pressed against the top rail of the dump body, especially at highway speeds. Consequently, there is a need for a system that can positively lock the tarp or cover in its deployed position, even under extreme wind loads and road vibration.

SUMMARY

According to one embodiment, a cover or tarping system is provided having a flexible cover deployable from a roller assembly for covering a container and a mechanism for extending and retracting the cover from the roller assembly. The locking mechanism includes a locking element mounted to the roller assembly and spanning at least a portion of the width of the cover. The locking element is arranged on the roller assembly with a portion of the length of the cover less than the entire length of the cover wound around the locking element. This portion of the cover corresponds to an extended length of the cover. The locking mechanism prevents further advancement of the cover from the roller assembly once the locking mechanism is uncovered when the cover is unwound In one embodiment, the locking element is a taut cable spanning the entire width of the cover. The cable may be removably mounted to the hubs of the roller assembly. In another embodiment, the locking element is a pair of rods extending inward from the roller assembly hubs but each spanning less than half the width of the cover. The removable locking elements allow the elements positioned at a certain number of windings of the cover onto the roller assembly. More particularly, the locking elements can be mounted to the roller assembly at a predetermined extended length of the cover. That extended length is then wound around the locking element onto the roller assembly. When the cover is unwound from the roller assembly, the locking element prevents further extension of the cover once the locking element is fully exposed.

In another feature, the hubs of the roller assembly may be configured to provide multiple locations for mounting and fastening the locking element. In one embodiment the hubs are square with an opening at each corner that is configured to receive the locking element and a fastening element for fastening the locking element to the hub.

DESCRIPTION OF THE PREFERRED EMBODIMENTS

Figure 1:
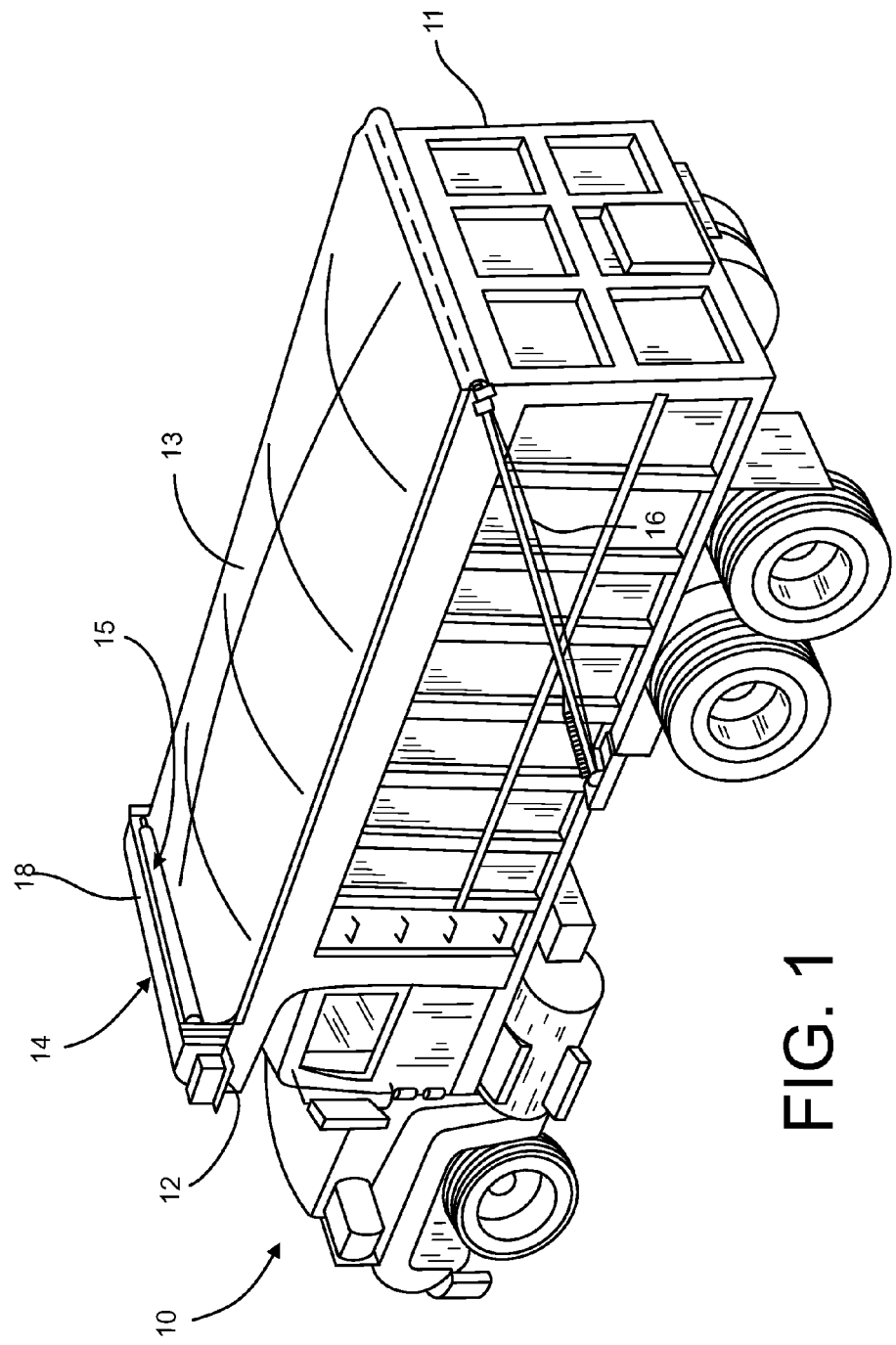
FIG. 1 is a top perspective view of a hauling vehicle utilizing a flexible tarping system.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Figure 2:
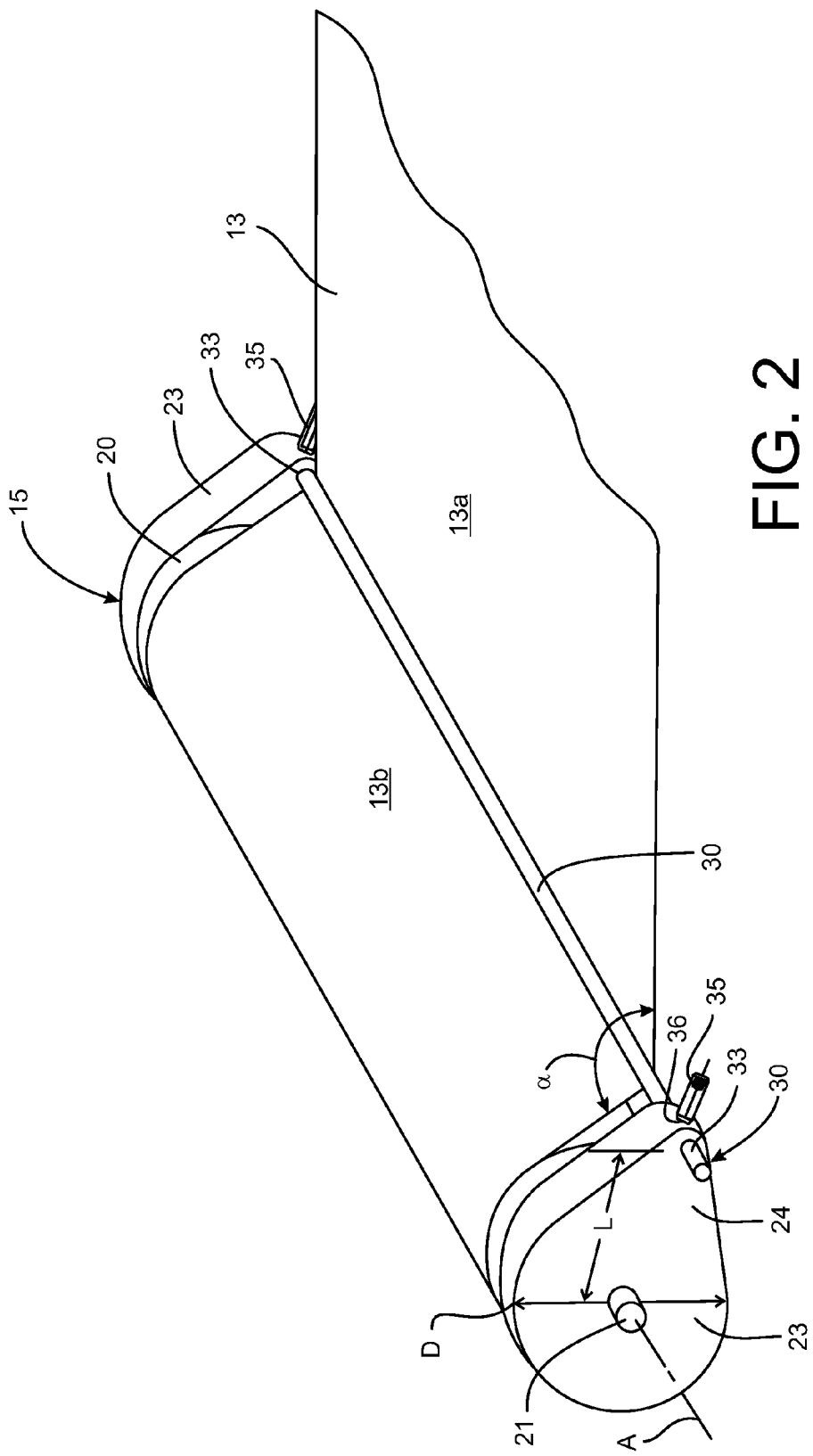
FIG. 2 is a perspective view of a roller assembly incorporating locking mechanism as disclosed herein, shown in the fully deployed position of the flexible tarp.

In accordance with one aspect of the invention, a locking element is provided that locks a flexible cover or tarp at a particular deployed length. Referring to FIG. 2, the roller assembly 15 includes a roller 20 supported between two hubs 23. The hubs support a roll bar 21 that supports the roller 20 and defines the axis of rotation for the roller assembly. The roll bar is connected to a drive mechanism 12 to roll the tarp 13 up onto the roller 20. The entire roller assembly 15 is rotatably mounted within the housing 18 to deploy or roll up the tarp. The roller assembly 15 as thus far described may be of any known construction, provided that the hubs 23 flanking the tarp rotate with the tarp as it is wound up or unwound.

The roller assembly 15 includes a locking element 30 that spans the width of the tarp and is anchored to the opposite hubs. In one embodiment the locking element 30 is a cable that extends through openings 33 in each hub 23. A fixing component in the form of a set screw 35 is threaded into a bore 36 in each hub that intersects the opening 33 so that the set screw can bear against the cable passing through the opening. The set screw 35 is tightened onto the cable 30 to fasten it to the hubs 23 and maintain the cable in tension. As shown in FIG. 2, the cable 30 passes across the tarp 13, separating the tarp into an extended segment 13a and a segment 13b that remains on the roller 20. The extended segment 13a is the portion of the tarp that is deployed over the open top of the dump body 11. The cable is offset from the surface of the roller 20 or more particularly from the surface of the non-extended segment 13b of the tarp wound onto the roller, so that an angle a is formed between the extended and non-extended segments of the tarp. In order to achieve this offset, the hubs 23 may be provided with an eccentric portion 24 which includes the openings 33 for the cable 30.

It can be appreciated that without the locking element 30 the tarp would unwind from the roller assembly 15 generally tangential to the diameter D of the roller assembly. The locking element in essence creates the angle a between direction of extension E (FIG. 3) of the tarp and the tarp as it is unrolled from the roller 20.

Figure 3:
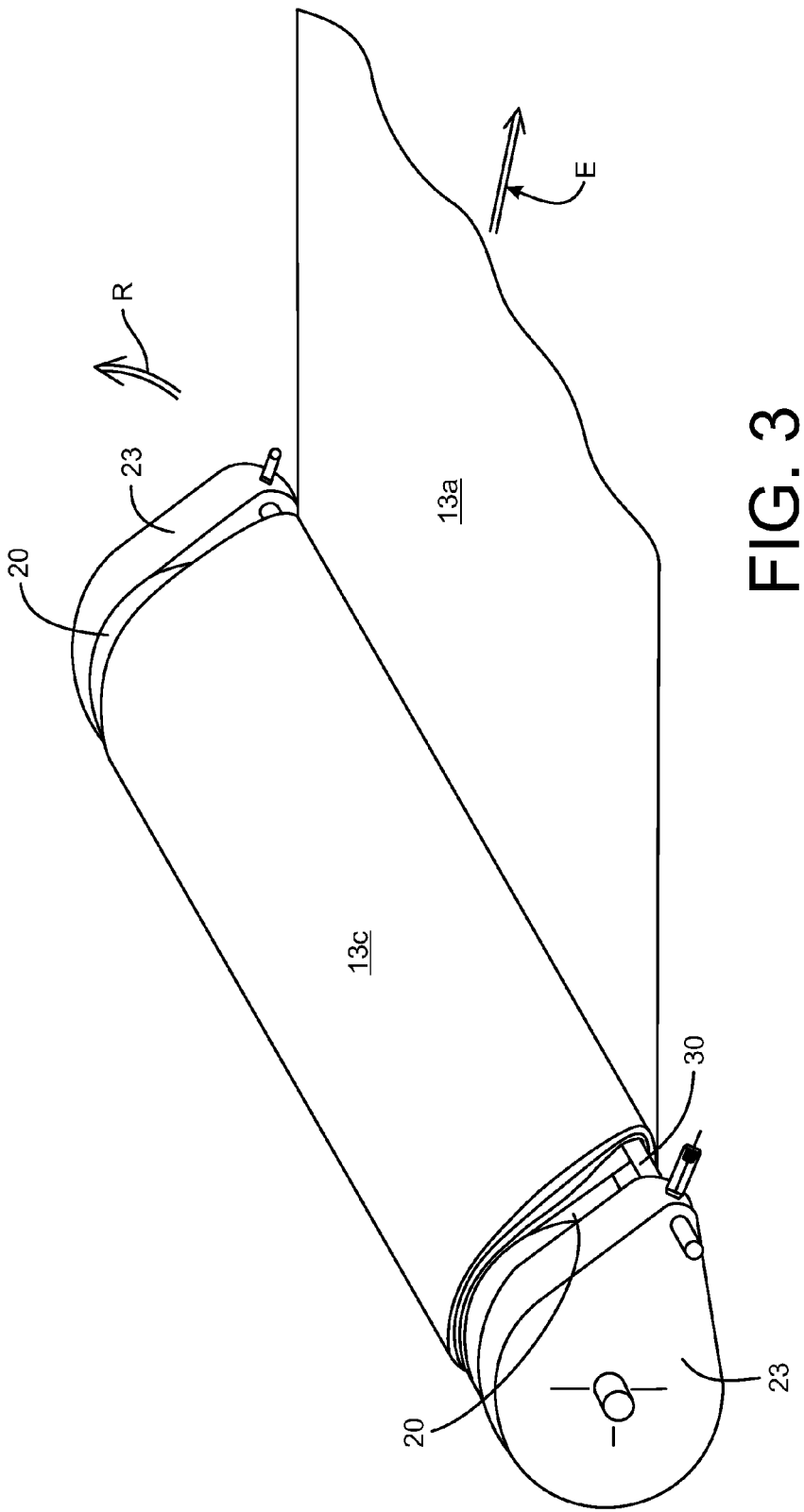
FIG. 3 is a perspective view of the roller assembly shown in FIG. 2 with the tarp in a partially stowed position.

The locking element or cable 30 is sized so that it does not impede rolling the extended segment 13a onto the roller 20 when the tarp is retracted, as shown in FIG. 3. Thus, in one specific embodiment the cable is a ⅛ in. steel cable. When the tarp is unwound from the roller 20, by pulling in the direction of the arrow E in FIG. 3, the extended segment 13a gradually unwinds from the roller. The extended segment 13a unwinds generally tangentially to the diameter D of the roller. As the roller rotates in the direction of the arrow R (FIG. 3) the cable becomes exposed and gradually bears against the extended segment 13a until the cable 30 reaches the position shown in FIG. 2 in which the cable is generally aligned with the extension direction E of the tarp from the housing 18. At this point the cable 30 stops any further movement of the tarp or rotation of the roller assembly 15. It can be appreciated that the locking element/cable gradually moves the direction of extension E from tangential to the roller 20 to essentially radial to the roller. At this point, any pulling force attempts to rotate the roller and tarp further, but this further rotation causes the cable to rotate as well, so that the cable bears with even greater force against the extended segment 13a. The cable thus becomes self-locking. On the other hand, the locking element 30 does not impede retraction of the tarp because the extended segment 13a is wound over the cable. An angle α of less than about 160° is believed to be sufficient to lock the tarp 13 and prevent any further deployment of the tarp from the housing 18 under any working conditions.

It is important that the locking element/cable 30 be aligned with the opening in the housing 18 through which the tarp is deployed. In order to facilitate proper orientation the hubs are eccentrically shaped, with an extended portion 24. The opening 33 is positioned within the extended portion. The opening 33 is offset from the central axis A through the roll bar 21 by a distance L that is generally equal to or greater than the diameter D of the hub. This offset produces the angle a between the extended and non-extended segments discussed above. It can be appreciated that this distance L is sufficient to accommodate different lengths of the non-extended segment 13b wound onto the roller 20, based on the length adjustment as described below.

One attribute of the locking element 30 is that it can be used to adjust the deployed length of the tarp 13. The cable 30 can be easily threaded through the openings 33 in the hubs 23 and fastened in place with the set screws 35. In order to establish the length of the extended segment 13a the installer can extend the tarp to the desired length and then attach the cable 30 by passing it through the openings 33 and tightening the set screws 35. Once the cable is installed the tarp 13 can be wound back onto the roller 20 and the roller assembly 15 can be mounted within the housing 18. It can be noted that the same adjustment process is used to adjust the deployed length where the roller assembly is mounted to the bail arm, rather than to the vehicle. Other fastening elements are contemplated for fastening the cable to the hubs.

Figure 4:
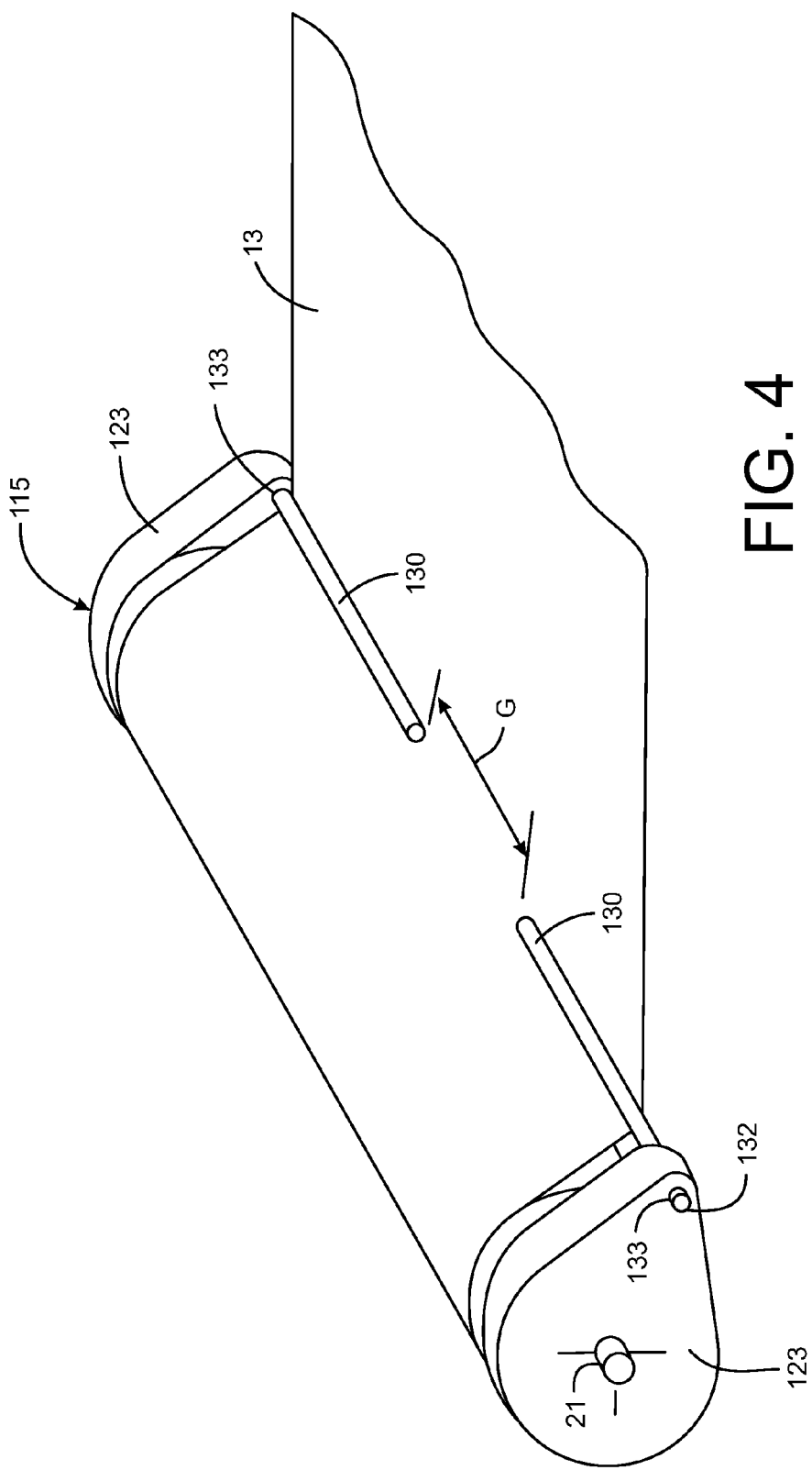
FIG. 4 is a perspective view of a roller assembly incorporating locking mechanism according to a further embodiment disclosed herein, shown in the fully deployed position of the flexible tarp.

Other forms of locking element may be implemented, such as the mechanism 130 depicted in FIG. 4 that is mounted to a roller assembly 115 that is similar in most respects to the assembly 15 described above. In this embodiment, the mechanism includes two rods 130 that pass through openings 133 in the hubs 123 of the roller assembly 115. The rods do not extend across the entire width of the tarp 13, but must span a sufficient portion of the tarp width to prevent the tarp from slipping through the gap G between the free ends of the rods. In addition, the rods and their engagement to the hubs must be sufficiently rigid to prevent the rods from deflecting under load from the tarp.

Rather than include the set screw (FIG. 2), other fastening elements may be provided to fasten the locking element to the hubs. For example, the engagement end 132 of each rod 130 may be configured to engage the respective opening 133, such as by way of a threaded engagement. Thus, the opening 133 may be internally threaded while the engagement end 132 of the rod 130 includes mating external threads. Alternatively, the end of the rod 130 may include internal threads and the engagement end 132 may include a bolt that passes through the opening 133 to engage the internal threads of the rod and fasten the rod to the hubs. Other fastening elements are contemplated that allow the rods 130 to be removed and re-installed to adjust the deployed length of the tarp 13. In addition, a single rod 130 may be utilized projecting from only one of the hubs 123. The rod may span the entire width of the tarp 13 or just a portion of the width, provided that it spans a sufficient distance to prevent the tarp from shifting away from the rod. With respect to the embodiment of FIG. 4 and the variations discussed above, the rod or rods preferably span over half the width of the tarp, and preferably at least 75% of the width.

Figure 5:
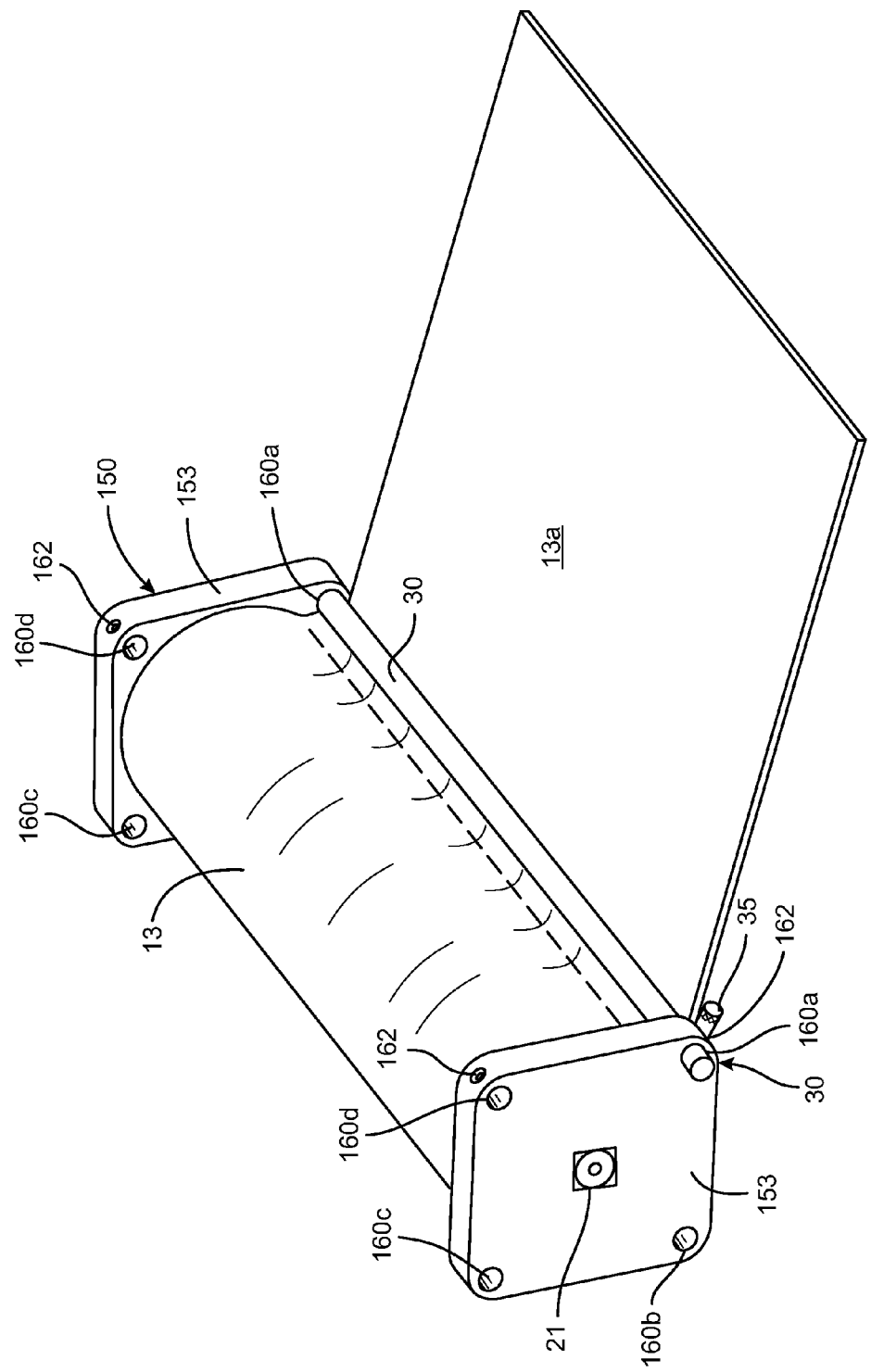
FIG. 5 is a perspective view of a roller assembly incorporating a locking mechanism according to another embodiment disclosed herein, shown in the fully deployed position.

In another embodiment shown in FIG. 5, a locking mechanism 150 includes hubs 153 with multiple positions for engaging the locking element 30 (or 130). In particular, the hubs 153 include openings 160a-160d distributed at different locations on the hubs. In the illustrated embodiment the hubs are square with the openings 160a-d situated at the four corners of the square. Other hub shapes are contemplated with the opening appropriately position, provided that the hub shape allows the openings to be positioned outside the diameter of the tarp 13 when it is in the fully deployed position depicted in FIG. 5, such as at the distance L (FIG. 2). The multiple openings 160a-d facilitate engagement of the locking element to the hubs of the roller assembly. Moreover, the multiple openings allows adjustment in the length of the tarp in its deployed position. For instance, engagement of the locking element in openings 160a can permit an extended portion 13a of tarp of a certain length, while moving the locking element to the next clockwise opening 160b leads to a reduced length of the extended portion.

In the illustrated embodiment, each opening 160a-d is provided with an intersecting bore 162 for receiving a locking screw 35 to clamp the locking element 30 within the corresponding opening. Of course, other locking elements and means for fastening the locking element to the hubs 153 are contemplated, as discussed above. For instance, the locking elements may be a cable or a generally rigid rod that spans the width between the hubs, or may be configured like the rods 130 to extend only part way across that width. The means for fastening the locking elements to the hubs may be the set screw 35, mating threads between the openings 160a-d and the locking element 30, a bolt or screw extending through the openings to engage a corresponding threaded bore in the locking element, or other structure suitable for fixing the locking element firmly to the hubs so that the element does not become dislodged when the tarp 13 is fully extended.

What is claimed is:

1. A locking mechanism for a cover system covering a container, the cover system having a flexible cover deployable from a roller assembly with a rotatable roller carrying the cover wound thereon and a mechanism for extending and retracting the cover from the roller assembly, the locking mechanism comprising a locking element mounted to the roller assembly for rotation with the roller and spanning a substantial portion of the width of the cover, said element arranged on the roller assembly such that a portion of the length of said cover is wound over said element when the cover is wound onto the roller assembly, wherein the portion of the length is less than the entire length of the cover.

2. The locking mechanism of claim 1, wherein said element is a cable spanning the entire width of the flexible cover.

3. The locking mechanism of claim 1, wherein said locking element is a generally rigid rod spanning the entire width of the flexible cover.

4. The locking mechanism of claim 1, wherein said locking element is removably mounted to the roller assembly.

5. The locking mechanism of claim 1, in which the roller includes hubs at opposite ends thereof rotatable with the roller, wherein said locking element is mounted to each of the hubs to extend across the cover.

6. The locking mechanism of claim 5, wherein said locking element is removably mounted to each of the hubs.

7. The locking mechanism of claim 6, wherein each hub defines an opening through which said locking element is received and including a fastening element configured for fastening said locking element within said opening.

8. The locking mechanism of claim 7, wherein:
said hub defines two or more openings through which said locking element may be selectively received; and
said fastening element is configured for fastening said locking element within a selected opening.

9. The locking mechanism of claim 8, wherein said hub is square-shaped and defines an opening at each corner of the square shape.

10. The locking mechanism of claim 7, wherein said fastening element includes a bore defined in said hub and intersecting said opening, and a set screw configured for engagement with said bore, said set screw arranged to bear against said locking element to fasten said locking element within the opening.

11. The locking mechanism of claim 5, wherein said locking element is a cable attached to the hubs and spanning the entire width of the flexible cover.

12. The locking mechanism of claim 11, wherein said hub includes a fastening element configured for removably fastening said cable to each hub.

13. The locking mechanism of claim 12, wherein each hub defines an opening through which said cable is received and said fastening element includes a bore intersecting the opening and a set screw configured for engagement within said bore and arranged to bear against said cable to lock said cable within the opening.

14. The locking mechanism of claim 5, wherein said locking element includes a pair of rods, one each mounted to a corresponding hub and each rod sized to extend across less than half the width of the cover.

15. The locking mechanism of claim 14, wherein each of said rods is removably mounted to a corresponding hub.

16. The locking mechanism of claim 15, wherein each hub defines a threaded opening and each of said rods includes a threaded end configured to be threadedly engaged within the threaded opening of the corresponding hub.

17. A cover system for covering a container, comprising:
a roller assembly rotatably supported on the container;
a flexible cover wound onto said roller assembly to be extended from the roller assembly to a fully extended length or retracted to be fully wound onto the roller assembly upon rotation of said roller assembly; and
a locking element mounted to and rotatable with said roller assembly and spanning a substantial portion of the width of said cover, said locking element arranged on said roller assembly such that a portion of the length of said cover is wound over said locking element when the cover is wound onto the roller assembly, said portion having a length less than the entire length of said cover and corresponding to fully extended length of said cover.

18. The cover system of claim 17, wherein said locking element is a cable spanning the entire width of the flexible cover.

19. The cover system of claim 17, wherein said locking element is removably mounted to said roller assembly.

20. The locking mechanism of claim 17, wherein said roller assembly includes hubs at opposite sides of said cover, said hubs each defining an opening through which said locking element is received and including a fastening element configured for fastening said locking element within said opening.

* * * * *